US007967979B2

(12) United States Patent
Grewal et al.

(10) Patent No.: US 7,967,979 B2
(45) Date of Patent: Jun. 28, 2011

(54) BI-PHASIC BIORETENTION SYSTEM

(75) Inventors: Parwinder S. Grewal, Wooster, OH (US); Edward L. McCoy, Wooster, OH (US); Warren A. Dick, Wooster, OH (US); Hanbae Yang, Wooster, OH (US)

(73) Assignee: The Ohio State University, Columbus, OH (US)

( * ) Notice: Subject to any disclaimer, the term of this patent is extended or adjusted under 35 U.S.C. 154(b) by 121 days.

(21) Appl. No.: 12/426,664

(22) Filed: Apr. 20, 2009

(65) Prior Publication Data

US 2009/0261026 A1 Oct. 22, 2009

Related U.S. Application Data

(60) Provisional application No. 61/045,974, filed on Apr. 18, 2008.

(51) Int. Cl.
*C02F 3/30* (2006.01)
*C02F 3/32* (2006.01)
(52) U.S. Cl. .............. 210/150; 210/170.03; 210/170.08; 210/602; 210/605
(58) Field of Classification Search .................. 210/150, 210/151, 170.03, 170.08, 255, 259, 532.2, 210/602, 605, 747, 903
See application file for complete search history.

(56) References Cited

U.S. PATENT DOCUMENTS

| 956,665 | A | * | 5/1910 | Ashley | 210/150 |
|---|---|---|---|---|---|
| 1,950,841 | A | * | 3/1934 | Crawford | 210/150 |
| 1,975,638 | A | * | 10/1934 | Alexandre | 210/151 |
| 3,770,623 | A | * | 11/1973 | Seidel | 210/602 |
| 3,829,377 | A | * | 8/1974 | Hashiamoato | 210/903 |
| 4,415,450 | A | * | 11/1983 | Wolverton | 210/602 |
| 4,824,572 | A | * | 4/1989 | Scott | 210/602 |
| 5,288,407 | A | * | 2/1994 | Bodwell et al. | 210/903 |
| 5,632,896 | A | | 5/1997 | Vandervelde et al. | |
| 5,702,593 | A | | 12/1997 | Horsley et al. | |
| 5,993,649 | A | * | 11/1999 | DeBusk et al. | 210/170.03 |
| 6,190,555 | B1 | * | 2/2001 | Kondo | 210/150 |
| 6,277,274 | B1 | | 8/2001 | Coffman | |
| 6,540,910 | B2 | * | 4/2003 | Schwarzenegger et al. | 210/151 |
| 6,569,321 | B2 | | 5/2003 | Coffman | |
| 6,592,761 | B2 | * | 7/2003 | Wofford | 210/602 |
| 6,858,142 | B2 | * | 2/2005 | Towndrow | 210/602 |
| 7,425,262 | B1 | * | 9/2008 | Kent | 210/170.03 |

(Continued)

FOREIGN PATENT DOCUMENTS

KR 10-2004-0053001 A 6/2004
KR 10-2005-0087949 A 9/2005

OTHER PUBLICATIONS

Applied Ecological Services, Inc., Example Rain Garden Plants, 2005, 2 pages, Brodhead, WI.

(Continued)

*Primary Examiner* — Christopher Upton
(74) *Attorney, Agent, or Firm* — Standley Law Group LLP (57) ABSTRACT

An anaerobic to aerobic sequence enhances biological degradation of many organic pollutants. Exemplary embodiments provide systems and methods for effective treatment of storm-water runoff pollutants such as hydrocarbons, nitrates, phosphorus, and heavy metals using sediment filtration and adsorption, and biochemical processes under bi-phasic bioretention conditions. By integrating these pollution cleanup pro-usages into a single unit, this apparatus optimizes retention time of the runoff through the system and maximizes removal rates of runoff pollutants, resulting in more reliable and efficient treatment mechanism than previous systems.

19 Claims, 5 Drawing Sheets

U.S. PATENT DOCUMENTS

| | | | |
|---|---|---|---|
| 7,510,649 B1 * | 3/2009 | Lavigne | 210/151 |
| 2001/0045383 A1 | 11/2001 | Coffman | |
| 2005/0126991 A1 * | 6/2005 | Austin et al. | 210/150 |
| 2007/0256966 A1 * | 11/2007 | Siviter et al. | 210/170.03 |
| 2009/0255868 A1 * | 10/2009 | Allen et al. | 210/602 |

OTHER PUBLICATIONS

Department of Environmental Resources, The Bioretention Manual, 2002, 189 pages, George's County, MD.

Dietz. M., Low Impact Development Techniques: Background. Current Research, and Site-Specific Design Variations, May 18, 2006, 43 pages, Concord, NH.

Detz, M. et al., Saturation Improve Pollutant Retention in a Rain Garden, Envionment Science & Tehnology, 2006, pp. 1335-1340, 40(4), American Chemical Society.

Kim, H. et al., Engineered Bioretention for Removal of Nitrate from Stormwater Runoff, Water Environment Research, Jul./Aug. 2003, pp. 355-367, 75(4).

* cited by examiner

BI-PHASIC BIORETENTION SYSTEM

CROSS-REFERENCE TO RELATED APPLICATIONS

This non-provisional patent application claims the benefit of priority to U.S. Provisional Patent Application No. 61/045,974, filed Apr. 18, 2008, which is hereby incorporated by reference in its entirety.

TECHNICAL FIELD

The disclosed embodiments of this application relate generally to the treatment of storm water runoff, and more particularly to the treatment of storm water runoff via bioretention systems.

BACKGROUND OF THE ART

Urban and suburban homeowners and business owners are increasingly interested in developing rain garden (bioretention) systems that can enhance the overall pleasant look of their landscapes. At the same time there is an increasing awareness of environmental stewardship. However, there is still a need for systems and methods that are aesthetically pleasing and efficient at cleaning storm water runoff. This and other unmet needs of the prior art are met by a system and device as described in more detail below.

SUMMARY OF THE INVENTION

Chemicals associated with, for example, transportation, lawn care and other activities, often make their way into urban/suburban storm-water runoff. Many of these chemicals have been found to be harmful to the environment and to humans, especially when concentrated in storm-water runoff. This contaminated runoff makes its way into the groundwater supply, making treatment necessary. One potential approach to treating this runoff is a low impact rain garden. Rain gardens are small, landscaped storm-water bioretention areas that promote infiltration of "remediated" storm-water into the ground. Rain gardens have become increasingly popular in urban and suburban areas due to the fact that they are designed to reduce runoff quantity and improve water quality in a natural and aesthetically pleasing manner. In spite of the increasing use of rain gardens, they are often limited in the integration of hydrology, soil, plant, and microbial components to optimize water flow, groundwater recharge and pollutant removal. An embodiment of the present application provides a modified design of the rain garden system which increases both retention time and treatment efficiency of runoff pollutants by creating a novel anaerobic to aerobic sequence.

Embodiments disclosed herein may be located in or adjacent to residential units, commercial buildings, and parking lots or roadsides in commercial and residential settings. Embodiments can be used as a total rain garden package for commercial use that will include design for storm-water flow control and pollutant removal.

The invention may be developed as a total rain garden package for commercial use that will include design for storm water flow control and pollutant removal. By creating a biphasic system in rain gardens, the hydrologic conditions (e.g. saturated and unsaturated conditions, water infiltration, and retention time) can be optimized to remove common pollutants such as hydrocarbons, nitrates, phosphorus and heavy metals from storm water runoff. Bioretention systems of the past utilize a single aerobic or anaerobic phase or an aerobic to anaerobic sequence in their bi-phasic system. However, unless specifically referring to systems of the past, when used in this application, the terms "bi-phasic system," "bi-phasic bioretention conditions," and "novel bi-phasic system" refers to the sequence of anaerobic to aerobic conditions disclosed in this application.

An anaerobic to aerobic sequence enhances biological degradation of many organic pollutants due to the fact that the bi-phasic bioretention conditions support a diversity of electron acceptors and environmental conditions, thus supporting a much wider range of degrading microorganisms than the aerobic to anaerobic sequences of conventional bioretention systems. Alternatively, this technology can be applied to design a system that will remediate a specific pollutant of interest at a specific site. The market for this invention is broad and includes individual residence to commercial/retail outfits to cities, and farms.

Exemplary embodiments provide a method for effective treatment of storm-water runoff pollutants such as hydrocarbons, nitrates, phosphorus, and heavy metals using sediment filtration and adsorption, and biochemical processes under bi-phasic bioretention conditions. By integrating these pollution cleanup pro-usages into a single unit, this apparatus optimizes retention time of the runoff through the system and maximizes removal rates of runoff pollutants, resulting in more reliable and efficient treatment mechanism than previous systems.

BRIEF DESCRIPTION OF THE DRAWINGS

A better understanding of the exemplary embodiments of the invention will be had when reference is made to the accompanying drawings, wherein identical parts are identified with identical reference numerals, and wherein:

FIG. 1 shows an outlet from the roadway to direct water from the roadway into a designated micropooling location in the bioretention system.

DETAILED DESCRIPTION OF A PREFERRED EMBODIMENT

Exemplary embodiments incorporate a sequence from anaerobic to aerobic conditions which enhance organic pollutant removal by microorganisms due to the fact that the bi-phasic bioretention conditions support a diversity of electron acceptors and environmental conditions, thus supporting a much wider range of degrading microorganisms. The embodiment shown in FIG. 1 includes an anaerobic zone 200, an aerobic zone 300. The size (i.e., surface area and medium depth) of each zone is determined based on the drainage area and the desired runoff volume to be caught and treated. In this embodiment, the storm-water runoff is directed to a micropooling area 100 in the anaerobic zone by an influent pipe 110.

Figure 1:
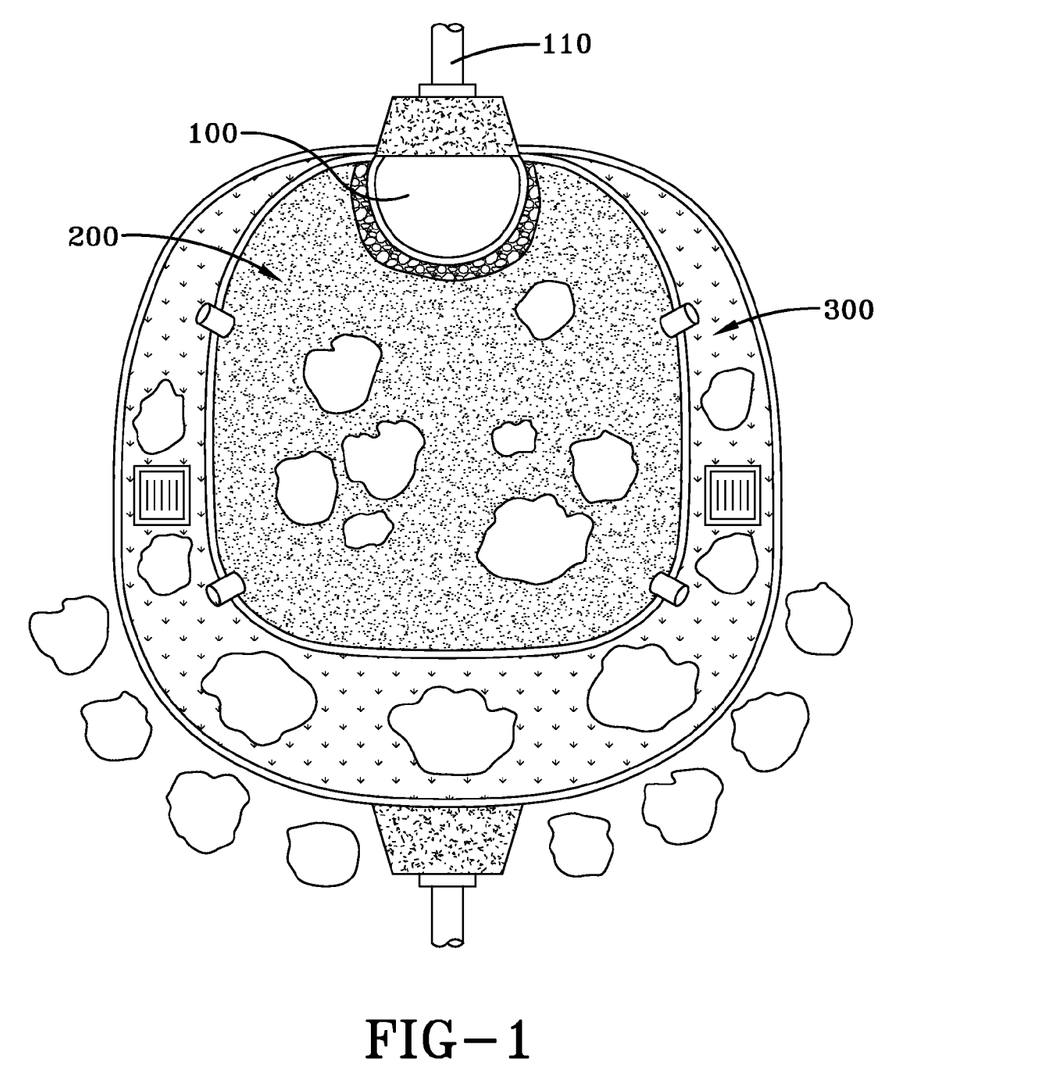
FIG. 1 is a plan view of an embodiment of the present system with the anaerobic zone positioned substantially in the center and the aerobic zone around it. The embodiment depicted in FIG. 1 represents one arrangement for a roadway rain garden.
Figure 2:
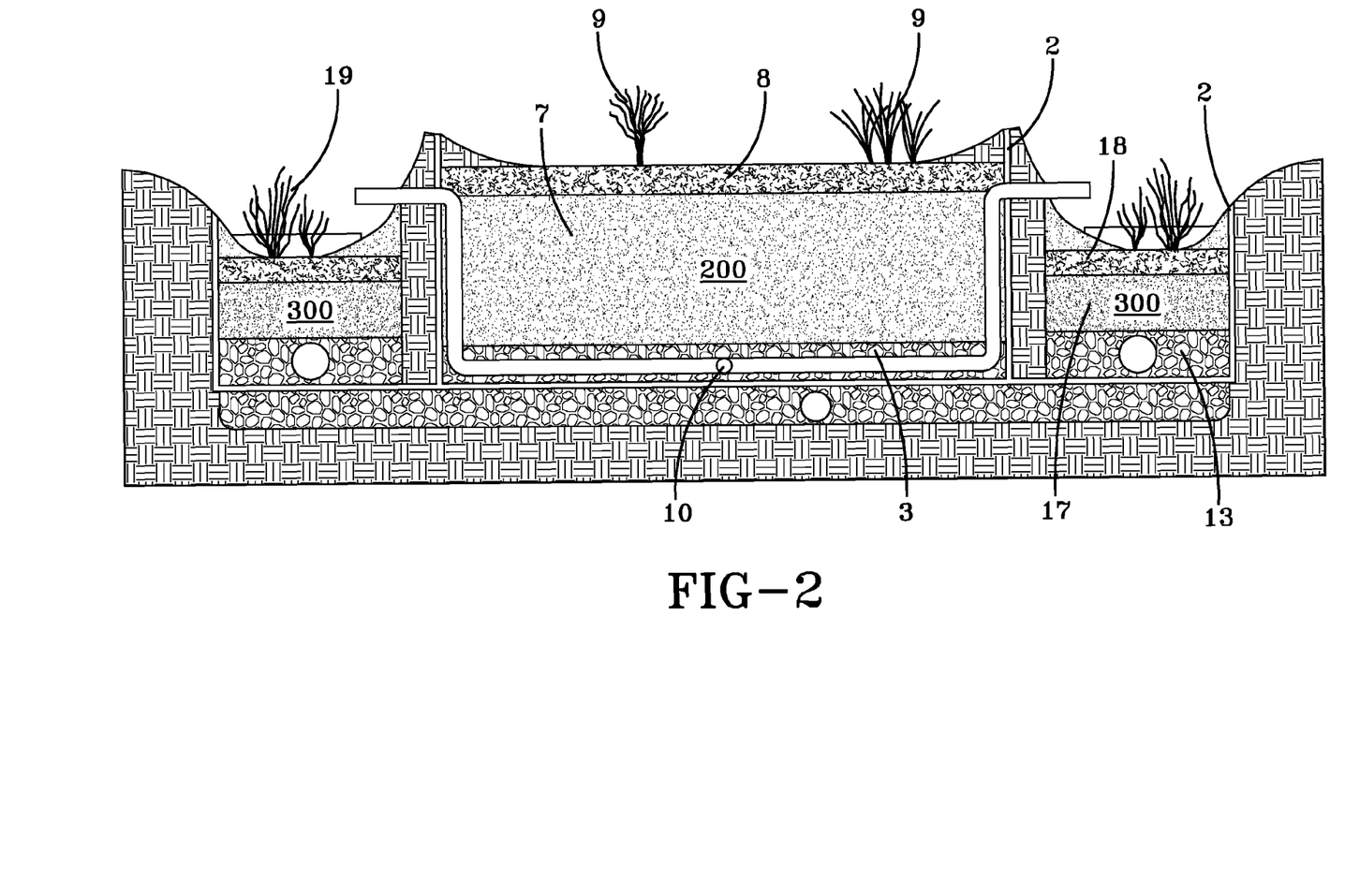
FIG. 2 is a cross-section view of the embodiment depicted in FIG. 1 showing an embodiment of the present system including plant life, the anaerobic zone A, the aerobic zone B, the reverse drainage system, and an optional overflow drainage pipe among others.

FIG. 2 further illustrates the composition of FIG. 1. In an embodiment, the anaerobic zone comprises plastic liners 2, drainage pipes (further illustrated in FIG. 3), an underdrainage layer 3, a mulch layer 8, herbaceous plants 9, and a mixture of sand, topsoil, and compost collectively 7. In the anaerobic zone, a first flush (½ to 1 in.) of the runoff is captured and remediated through sediment filtration and adsorption and/or anaerobic biochemical degradation of pollutants by creating water saturated conditions. The remediated water (overflow) from the anaerobic zone is directed into the aerobic zone 200 through reverse drainage pipes (alternatively depicted in FIG. 3). In this way retention times within the anaerobic zone may increase, providing increased biochemical degradation opportunities.

The aerobic zone, 300, where the water may be further treated through sediment infiltration and adsorption, and aerobic biochemical processes, comprises an underdrainage layer 13, a mulch layer 18, herbaceous plants 19, and a mixture of sand, topsoil, and compost collectively 17. With a high infiltration rate (2 in/hr and above), aerobic conditions are maintained in this zone. The treated water may be discharged to the recharge zone and/or drainage system. Alternatively, the anaerobic zone may include an overflow treatment bypass 10. The overflow treatment bypass allows for quick drainage of either excess rainwater or remediated water from the anaerobic zone. The overflow treatment bypass will allow excess water to drain directly to the recharge and or drainage system in order to maintain aerobic conditions.

The reverse drainage system for transporting treated runoff from the anaerobic zone to the aerobic zone enables longer storage of storm-water runoff for more effective treatment of pollutants. Additionally, by setting up the level of reverse drainage pipes below the medium layer in the anaerobic zone, it decreases the formation of ponds on the top of the anaerobic zone. An exemplary embodiment may therefore reduce the opportunity for mosquitoes to breed (a common drawback for many conventional bioretention systems). Moreover, the creation of bi-phasic bioretention conditions in the embodiment can mineralize many organic pollutants which cannot be mineralized in either condition alone. Furthermore, the system lends for the inclusion and replacement of growing media carrying specific pollutant degrading microorganisms.

Figure 3:
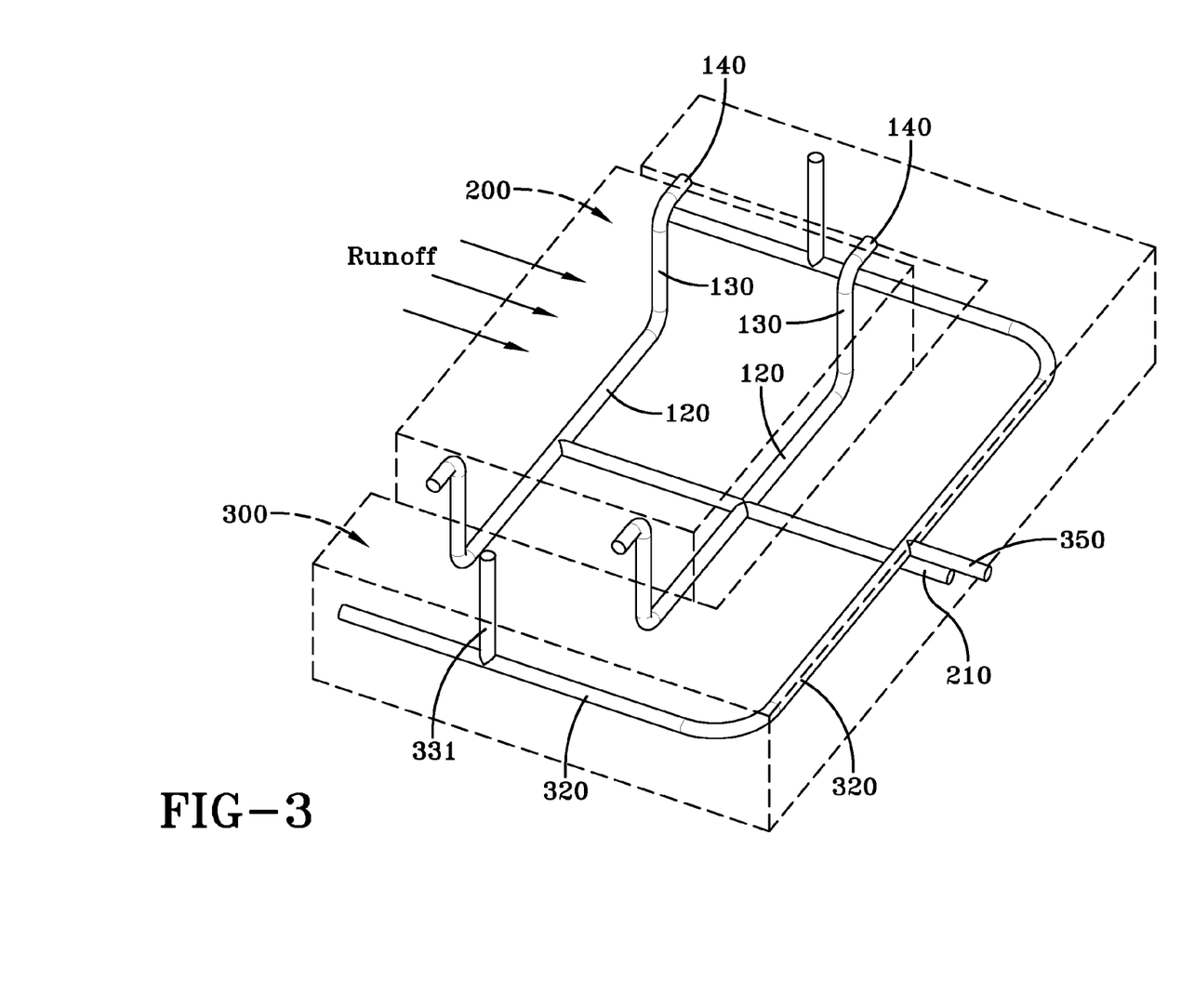
FIG. 3 is a schematic of the embodiment depicted in FIG. 1 including the anaerobic zone, the aerobic zone and the reverse drainage system.

FIG. 3 is a schematic depiction of an embodiment of a novel bi-phasic bioretention system with the components of the anaerobic and anaerobic zones removed for illustration of an exemplary drainage system. In this embodiment, the anaerobic zone is in the interior and the aerobic zone is depicted as wrapping around the anaerobic zone on three sides, this depiction is not intended to limit the present application to this arrangement of anaerobic and aerobic zones, it is merely intended to illustrate one embodiment of the reverse drainage system.

Initially, untreated storm-water runoff is directed into the anaerobic zone, it passes via gravity through the mulch layer 8 and the sand, topsoil and compost mixture 7. After passing through these layers, the runoff filters through a layer of inorganic aggregate material (such as sand or gravel) to reach at least one horizontal pipe 120 from the reverse drainage system running along the lower interior of the anaerobic zone. The horizontal pipes are positioned to allow water that has passed through the anaerobic zone to enter the reverse drainage system. The horizontal pipe is in communication with the at least one vertical pipe 130. The vertical pipes will reach from the horizontal pipes to a height at least above the top of the aerobic zone. The at least one vertical pipe may further include, at its peak, a second horizontal pipe 140, in communication with the vertical pipe. This second horizontal pipes serve to deliver the water from the vertical pipes to the aerobic zone. When the water level in the anaerobic zone increases and reaches the height of the top of the at least one vertical pipe, the remediated water may then flow from the reverse drainage pipe into the aerobic zone. This configuration increases the time that runoff water spends in the anaerobic zone as only treated water passes through the reverse drainage system to reach the aerobic zone. Additionally, embodiments of the system may incorporate a bypass drainage pipe 210. The bypass drainage pipe is in communication with the anaerobic zone and allows excess water that has passed through the anaerobic zone to pass out of the system.

After the runoff water has passed from the second horizontal pipe 140, it enters the aerobic zone. The water will then filter through the layers of the aerobic zone via gravity, being remediated as it falls. Much like the anaerobic zone, the aerobic zone has at least one horizontal pipe adjacent to the bottom of the zone. When the runoff water has been treated by passing through the layers of the aerobic zone it will again pass through a layer of inorganic aggregate material at the bottom of the aerobic zone. Once the water has passed through the aggregate it will enter another horizontal pipe 320 and out a final effluent pipe 350 into a discharge zone or to the general groundwater supply.

Additionally, embodiments of the present system may include at least one bypass drain 331. The bypass drain 331 may include an inlet 332 (seen in FIG. 5) that sits above the top level of the aerobic zone and is in communication with the horizontal pipe at the bottom of the aerobic zone. This alternative bypass drain serves to prevent excess water (either rainwater or water that has passed from the anaerobic zone) from pooling on the surface of the aerobic zone. This bypass drain allows the excess water to drain directly out of the system if the water level should reach a predetermined height.

Figure 4:
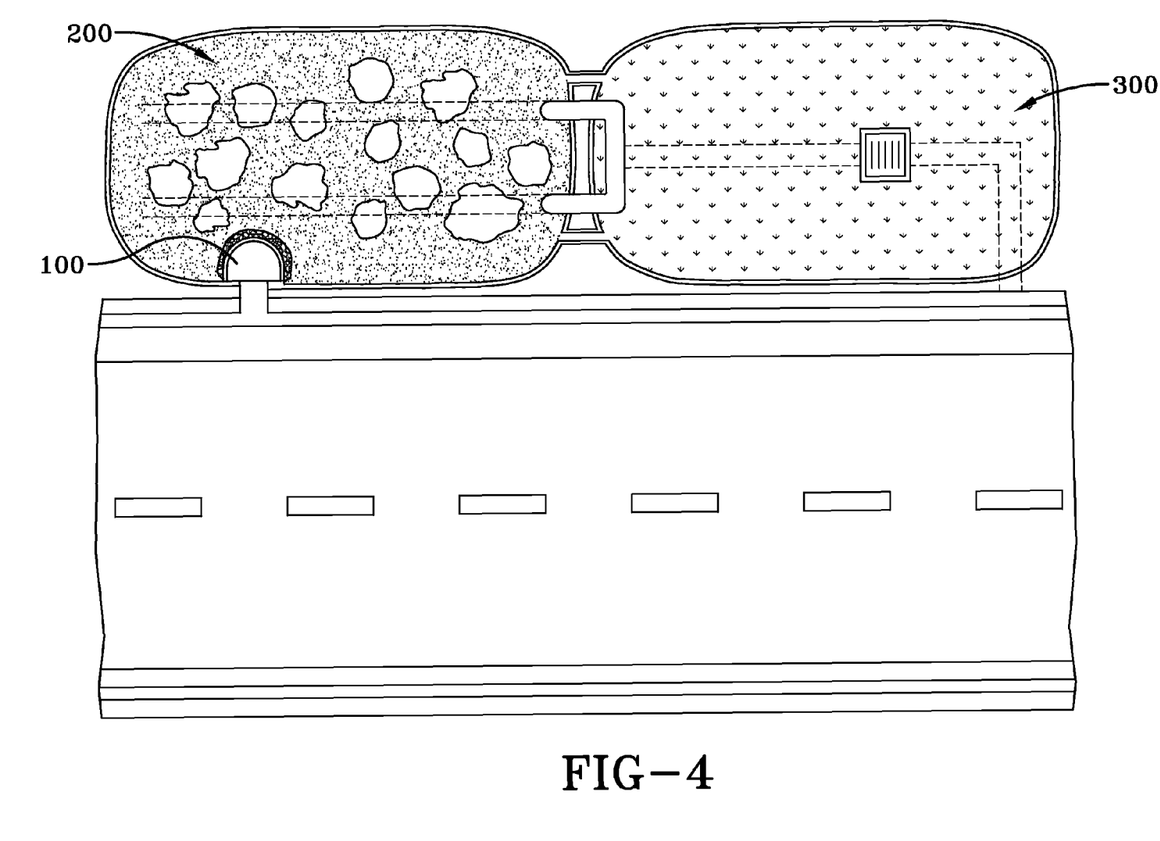
FIG. 4 is an alternative embodiment of the system positioned adjacent to a roadway.

FIG. 4 depicts an alternative embodiment of the system positioned next to a roadway. In this embodiment, the anaerobic zone 200 is positioned on the left and the aerobic zone on the right. The runoff from the roadway will pass through the inlet 100 and into the bioretention system.

Figure 5:
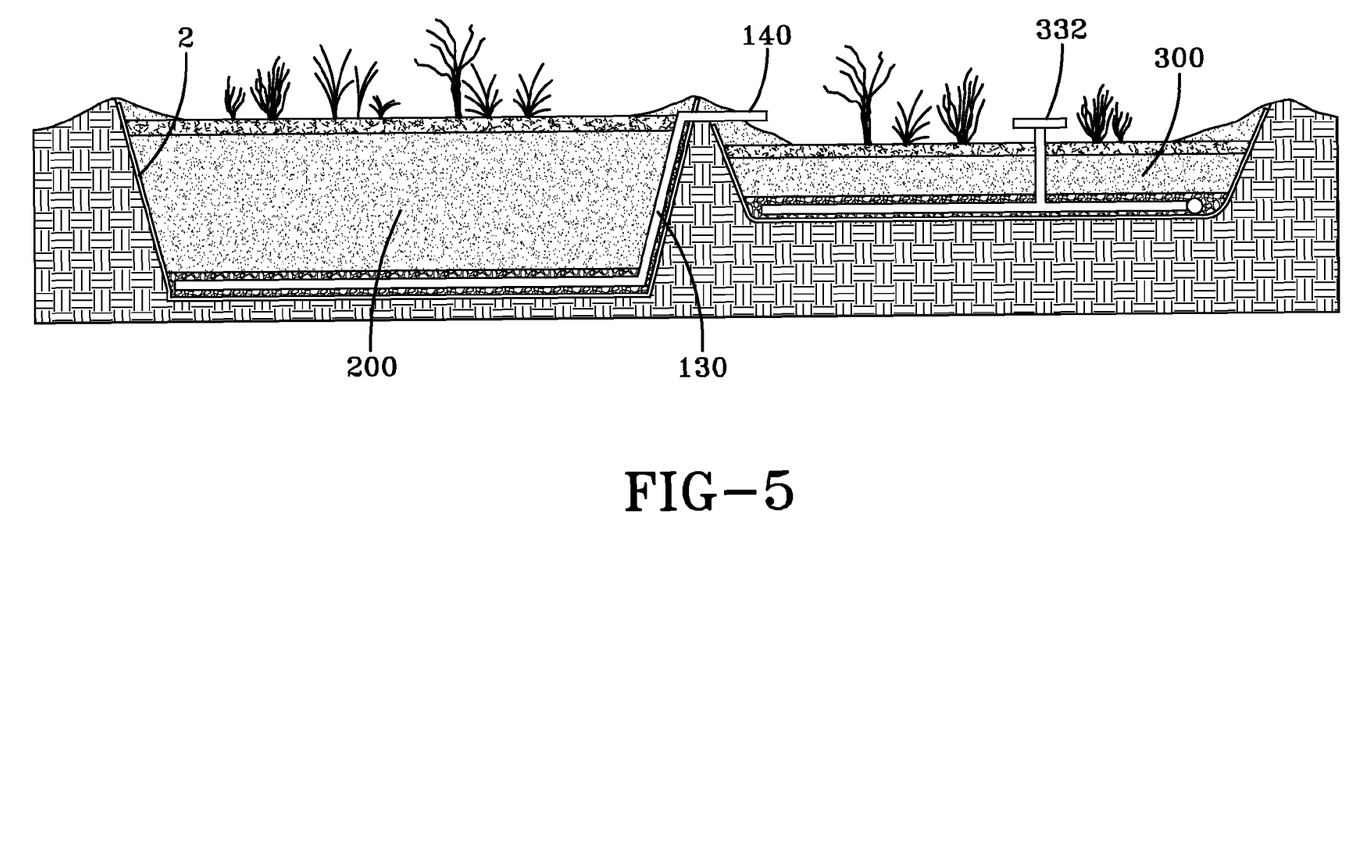
FIG. 5 is a cross-section view of the embodiment illustrated in FIG. 4.

FIG. 5 is a cross-section view of the embodiment of the FIG. 4. The water impermeable liner 2 defines the bottom and sides of the anaerobic zone. A section of the reverse drainage system including a vertical pipe 130 and a second horizontal pipe 140 can be viewed. Additionally, FIG. 5 displays the inlet 332 for the optional bypass drain.

The illustrated embodiments depict the system as having one anaerobic zone and one aerobic zone. Alternatively, the system may include many single anaerobic to aerobic systems arranged in parallel, one anaerobic zone feeding a plurality of aerobic zones, or a plurality of anaerobic zones feeding one aerobic zone. The nature and amount of contaminants will determine the overall design of the specific bioretention system and the plants and microorganisms employed in it.

The choice of plant species to be included in the rain garden is important due to species susceptibility and the different remediation and soil tolerances of different plant species. In an embodiment of the present application, at least four species of plants are employed in each zone of the system.

The following is a non-exhaustive list of potential plant species for use in an embodiment of the anaerobic zone: *Spirea alba; Asclepias incarnate; Eupatorium perfoliatum; Verbena hastate; Iris shrevei; liatris pycnostachya; Lobelia*

*siphilitica, Tradescantia ohiensis; Lobelia cardinalis; Pycnanthemum virginianum; Monarda fistulosa; Veronicastrum virginicum; Zizia aurea.*

The following is a non-exhaustive list of potential plant species for use in an embodiment of the aerobic zone: *Echinacea pallida; Sorghastrum nutans; Demodium canadense; Rudbeckia triloba; Helianthus mollis; Aster novae-angliae; Liatris aspera; Asclepias syriaca; Aquilegia canadensis; Penstemon digitalis; Rudbeckia hirta; Aster sericeus; Ceanothus americanus; Echinacea purpurea; Liatrus aspera; Verbena stricta; Allium cernuum; Amorphae cansecens; Viola pedeta; Petalostum umpurpureum; Aster azureus; Campanula rotundiflolia; Geum triflorum; Sporobolus heterolepsis.*

Having shown and described various embodiments of the invention, those skilled in the art will realize that many variations and modifications may be made to the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for remediating runoff water comprising:
an anaerobic zone to receive runoff water;
a reverse drainage pipe for receiving treated water from the anaerobic zone;
the anaerobic zone includes a filter media and live plants growing in the filter media, the filter media comprising:
a layer of inorganic aggregate material comprising materials such as sand or gravel, the depth of the inorganic aggregate material layer being greater than the diameter of the at least one reverse drainage pipe;
a layer of soil mixture, the soil mixture comprising: an inorganic material including at least one of sand or aggregate, and a material that includes top soil and organic matter, the soil mixture layer overlying the inorganic aggregate layer;
a mulch layer overlying overlays the soil mixture layer; and
an aerobic zone positioned to receive the outflow from the reverse drainage pipe.

2. The system of claim 1, wherein the anaerobic zone further comprises a substantially water impermeable layer defining a bottom surface of the anaerobic zone, and having a sidewall and an open top.

3. The system of claim 2, wherein the aerobic zone further comprises a substantially water impermeable layer having an open top, a sidewall, and defining a bottom surface; said open top positioned below the outlet of the reverse drainage pipe, and in communication with the atmosphere.

4. The system of claim 3, wherein the at least one reverse drainage pipe comprises a horizontal pipe adjacent to the bottom surface of the anaerobic zone and at least one vertical pipe adjacent to the sidewall, said horizontal and vertical pipes in fluid communication with one another.

5. The system of claim 4, wherein the horizontal pipe of the at least one reverse drainage pipe further includes a plurality of openings to receive water from the anaerobic zone.

6. The system of claim 5, wherein the at least one vertical pipe extends vertically along the sidewall of the anaerobic zone, and the at least one reverse drainage pipe further includes a second horizontal pipe extending over the top of the aerobic zone at the top of the at least one vertical pipe, said second horizontal pipe in fluid communication with the at least one vertical pipe.

7. The system of claim 6, wherein the at least one vertical pipe extends vertically to a height below the top of the soil mixture layer of the anaerobic zone.

8. The system of claim 7, wherein the aerobic zone further includes a filter media and live plants growing in the filter media, said filter media comprising:
a layer of an inorganic aggregate material such as sand or gravel;
a layer of a soil mixture, said soil mixture comprising:
an inorganic material including at least one of sand or aggregate, and a material that includes top soil and organic matter, the soil mixture layer overlying the inorganic aggregate layer; and
a mulch layer overlying the soil mixture layer.

9. The system of claim 8, wherein the aerobic zone further includes at least one horizontal pipe adjacent to the bottom of the aerobic zone.

10. The system of claim 9, wherein the at least one horizontal pipe in the aerobic zone further includes a plurality of openings to receive treated water from the aerobic zone.

11. The system of claim 10, wherein the horizontal pipe in the aerobic zone further includes an opening to allow the water to flow from the aerobic zone after treatment.

12. The system of claim 1, wherein the aerobic zone further comprises a substantially water impermeable layer having an open top, a sidewall, and defining a bottom surface; said open top positioned below the outlet of the reverse drainage pipe, and in communication with the atmosphere.

13. The system of claim 1, wherein the at least one reverse drainage pipe comprises a horizontal pipe adjacent to the bottom of the anaerobic zone and at least one vertical pipe adjacent to the sidewall, said horizontal and vertical pipes in fluid communication with one another, and wherein the horizontal pipe includes a plurality of holes to receive treated water.

14. The system of claim 13, wherein the at least one vertical pipe extends vertically along the sidewall of the anaerobic zone, and the at least one reverse drainage pipe further includes a second horizontal pipe extending over the top of the aerobic zone at the top of the at least one vertical pipe, said second horizontal pipe in fluid communication with the at least one vertical pipe.

15. The system of claim 1, wherein the aerobic zone further includes a filter media and live plants growing in the filter media, said filter media comprising:
a layer of an inorganic aggregate material such as sand or gravel;
a layer of a soil mixture, said soil mixture comprising:
an inorganic material including at least one of sand or aggregate, and a material that includes top soil and organic matter, the soil mixture layer overlying the inorganic aggregate layer; and
a mulch layer overlying the soil mixture layer.

16. The system of claim 15, wherein the aerobic zone further includes at least one horizontal pipe adjacent to the bottom of the aerobic zone, wherein the at least one horizontal pipe further includes a plurality of openings to receive treated water from the aerobic zone, and wherein the at least one horizontal pipe further includes an opening to allow the water to flow from the aerobic zone after treatment.

17. The system of claim 16, wherein both the anaerobic zone and the aerobic zone are positioned substantially beneath ground level.

18. A system for remediating runoff water comprising:
an anaerobic zone to receive runoff water, positioned substantially beneath ground level, the anaerobic zone comprising filter media including live plants growing in the filter media, the filter media comprising:
  an aggregate layer, comprising sand or gravel, the depth of the inorganic aggregate material layer being greater than the diameter of the at least one reverse drainage pipe;
  a soil layer comprising an inorganic material including at least one of sand or aggregate, and a material that includes top soil and organic matter, the soil mixture layer overlying the inorganic aggregate layer; and
  a mulch layer;
a reverse drainage pipe for receiving treated water from the anaerobic zone; and
an aerobic zone positioned substantially beneath ground level and positioned to receive the outflow from the reverse drainage pipe.

19. A surface-water treatment system comprising:
an anaerobic zone comprising filter media including a plant biofilter, the filter media comprising an inorganic aggregate layer, a soil layer, and a mulch layer;
a series of pipes for receiving water treated in the anaerobic zone and a reverse flow pipe in communication with the series of pipes for transferring water from the anaerobic zone to the aerobic zone;
an aerobic zone positioned to receive treated water from the anaerobic zone via the reverse flow pipe.

* * * * *